United States Patent
Nakata et al.

(10) Patent No.: US 10,882,183 B2
(45) Date of Patent: Jan. 5, 2021

(54) ROBOT CONTROLLING METHOD AND WELDING METHOD

(71) Applicant: Panasonic Intellectual Property Management Co., Ltd., Osaka (JP)

(72) Inventors: Hiroyuki Nakata, Osaka (JP); Atsumi Hashimoto, Osaka (JP); Yasuyoshi Honuchi, Osaka (JP); Ryosuke Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/316,041

(22) PCT Filed: May 9, 2017

(86) PCT No.: PCT/JP2017/017437
§ 371 (c)(1),
(2) Date: Jan. 8, 2019

(87) PCT Pub. No.: WO2018/061283
PCT Pub. Date: Apr. 5, 2018

(65) Prior Publication Data
US 2020/0009726 A1    Jan. 9, 2020

(30) Foreign Application Priority Data
Sep. 27, 2016  (JP) .................................. 2016-188088

(51) Int. Cl.
*B25J 9/16*   (2006.01)
*B25J 9/10*   (2006.01)
(Continued)

(52) U.S. Cl.
CPC ............... *B25J 9/1641* (2013.01); *B23K 9/12* (2013.01); *B25J 9/10* (2013.01); *G05B 19/404* (2013.01);
(Continued)

(58) Field of Classification Search
None
See application file for complete search history.

(56) References Cited

U.S. PATENT DOCUMENTS 6,252,368 B1    6/2001   Sugie
6,889,115 B2 *  5/2005   Shiba .................. G05B 19/404
                                                       700/186

(Continued)

FOREIGN PATENT DOCUMENTS

EP    1 621 947    2/2006
JP    2-239303     9/1990
(Continued)

OTHER PUBLICATIONS

International Search Report of PCT application No. PCT/JP2017/017437 dated Aug. 1, 2017.
(Continued)

*Primary Examiner* — Bickey Dhakal
(74) *Attorney, Agent, or Firm* — Wenderoth, Lind & Ponack, L.L.P.

(57) ABSTRACT

A robot controlling method for operating an arm using a motor includes: performing, before the arm stops, addition to add a backlash compensation value to a position command which is input to the motor; and performing, in a period during which the robot arm is not in motion, subtraction to reduce the backlash compensation value added to the position command.

10 Claims, 20 Drawing Sheets

(51) Int. Cl.
*G05B 19/404* (2006.01)
*B23K 9/12* (2006.01)
*B25J 11/00* (2006.01)

(52) U.S. Cl.
CPC ... *B25J 11/005* (2013.01); *G05B 2219/41041* (2013.01)

(56) References Cited

U.S. PATENT DOCUMENTS

| | | | |
|---|---|---|---|
| 9,541,916 B2* | 1/2017 | Nakamura | G05B 19/404 |
| 9,874,865 B2* | 1/2018 | Wada | B25J 9/1641 |
| 9,895,806 B2* | 2/2018 | Harada | B25J 9/1641 |
| 2009/0107969 A1* | 4/2009 | Asai | B23K 9/0216 |
| | | | 219/124.1 |
| 2014/0197773 A1* | 7/2014 | Ikai | G05B 19/404 |
| | | | 318/630 |
| 2014/0222186 A1 | 8/2014 | Wada et al. | |
| 2018/0095446 A1* | 4/2018 | Hashimoto | B23Q 15/007 |

FOREIGN PATENT DOCUMENTS

| | | |
|---|---|---|
| JP | 7-185816 | 7/1995 |
| JP | 8-076847 | 3/1996 |
| JP | 2000-250614 | 9/2000 |
| JP | 2013-054436 | 3/2013 |

OTHER PUBLICATIONS

The Extended European Search Report dated Jan. 31, 2020 in corresponding European Patent Application No. 17855242.8.

* cited by examiner

US 10,882,183 B2

ROBOT CONTROLLING METHOD AND WELDING METHOD

CROSS-REFERENCE TO RELATED APPLICATIONS

This application is a U.S. national stage application of the PCT International Application No. PCT/JP2017/017437 filed on May 9, 2017, which claims the benefit of foreign priority of Japanese patent application 2016-188088 filed on Sep. 27, 2016, the contents all of which are incorporated herein by reference.

TECHNICAL FIELD

The present disclosure relates to a robot controlling method and particularly to a robot controlling method and a welding method for compensating for a positional deviation caused by backlash.

BACKGROUND ART

Conventionally, in a control device which operates a component by driving a servo motor via a reducer, there occurs a phenomenon in which the position of a component indicated in a command for the servo motor and an actual position of the component deviate as much as play (clearance) of the reducer, which is what is called backlash. When the driving direction of the servo motor is reversed, the deviation direction of the backlash is also reversed.

When the backlash occurs, for example, if the operating direction is different, even the same position of the servo motor does not lead to the same stop position during implementation. In the case of a teaching/playback robot, if the operating direction is different between a teaching operation and a playback operation, there occurs error between the position assumed in the teaching operation and the position assumed in the playback operation. In the teaching operation, the position of the tip of the arm is often finely adjusted by being moved back and forth relative to a target position, specifically, by reversing the rotation direction of the motor; in many cases, it is unclear in which direction the tip of the arm has stopped. In other words, there are cases where teaching modification is required after playback.

Furthermore, when the position of the tip of the arm is reversely operated, the amount of movement of the actual position is offset by the play (clearance) of the reducer due to the backlash. Therefore, the position of the tip of the arm does not move the designated distance. Thus, the position of the tip of the arm does not readily reach the target position, which may cause an increase in teaching hours.

Therefore, in a conventionally proposed technique, a reversal of the driving direction of a servo motor is detected, and compensation signals having different signs are added to a position command signal for the servo motor before and after the reversal to perform backlash compensation (for example, refer to Patent Literature (PTL) 1).

CITATION LIST

Patent Literature

PTL 1: Unexamined Japanese Patent Publication No. 2000-250614

SUMMARY OF THE INVENTION

A robot controlling method according to the present disclosure is for operating an arm using a motor and includes:

performing, before the arm stops, addition to add a backlash compensation value to a position command which is input to the motor; and performing, in a period during which the arm is not in motion, subtraction to reduce the backlash compensation value added to the position command A welding method according to the present disclosure is for operating, using a motor, an arm having a wire attached thereto and welding a workpiece using the wire and includes:

performing, before the arm stops, addition to add a backlash compensation value to a position command which is input to the motor;

performing, in a period during which the arm is not in motion, subtraction to reduce the backlash compensation value added to the position command;

producing an electric arc between the wire and the workpiece after the arm stops; and moving the arm to move the wire and welding the workpiece after the electric arc is produced.

DESCRIPTION OF EMBODIMENTS

In the case where a robot is reversely operated after having stopped, when backlash compensation such as that disclosed in PTL 1 is applied, a backlash compensation portion is added to a position command for the reverse operation, and thus the speed immediately after the start of the operation may rise.

Hereinafter, the present embodiment will be described in detail with reference to the drawings. The following description of a preferred embodiment is essentially a mere example.

Configurations of Robot and Control System for Robot

Figure 1:
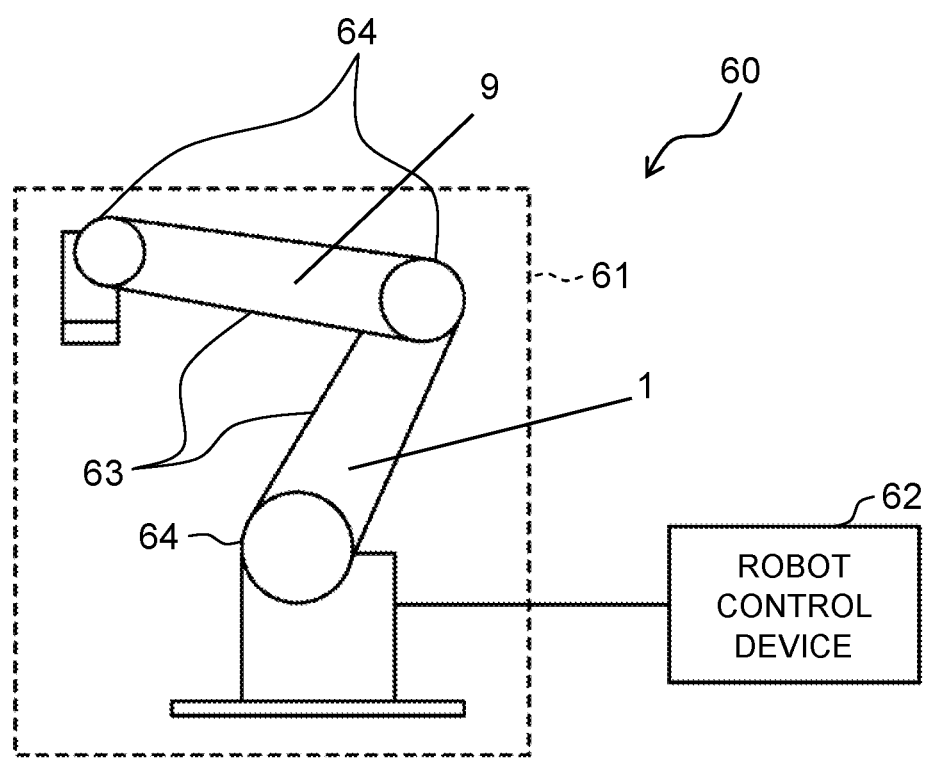
FIG. 1 is a schematic configuration diagram of a vertically articulated 6-axis robot according to an embodiment.

FIG. 1 is a schematic configuration diagram of a vertically articulated 6-axis robot according to the embodiment.

Figure 2:
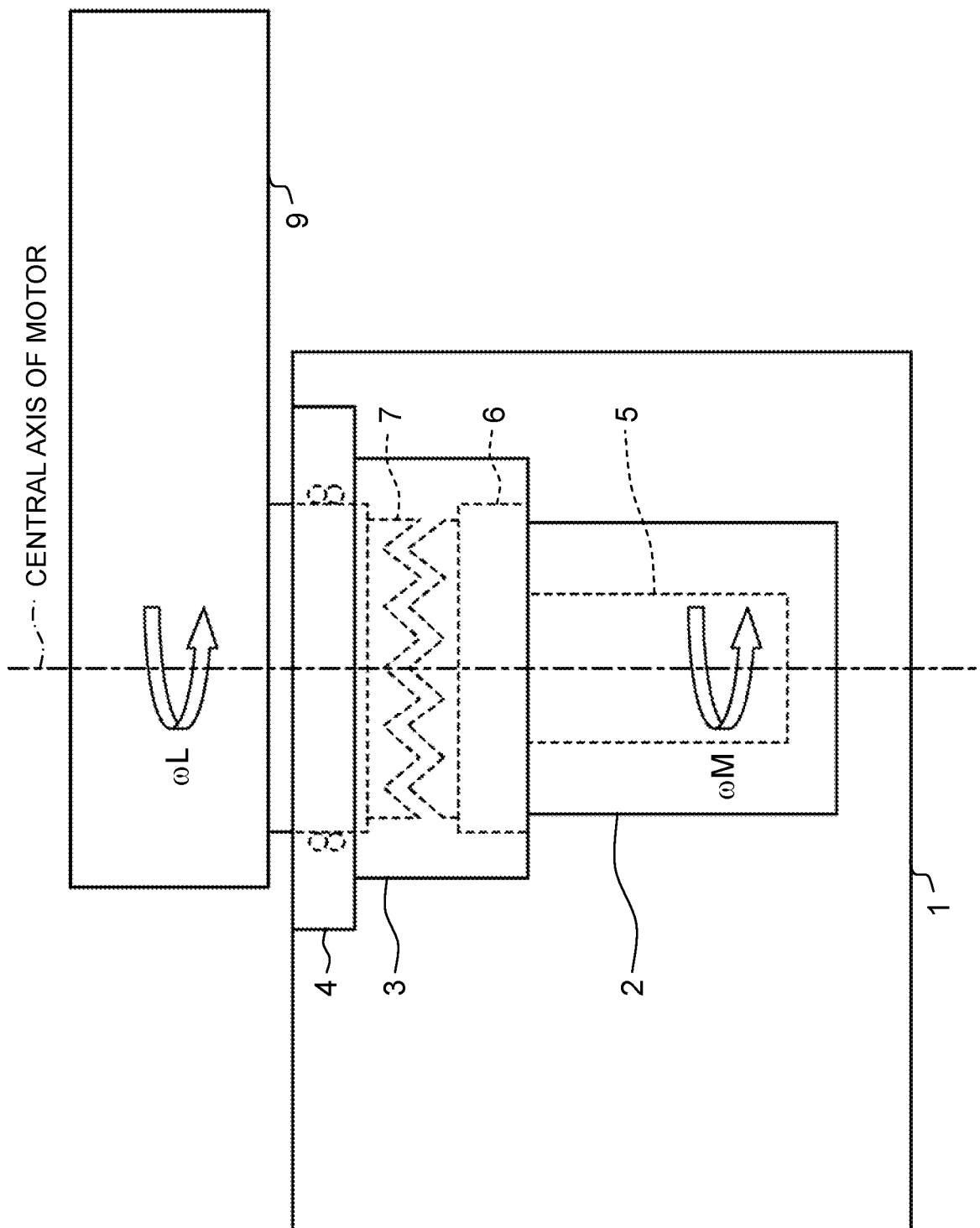
FIG. 2 is a schematic configuration diagram of a robot mechanism according to an embodiment.

FIG. 2 is a schematic configuration diagram of a robot mechanism according to the embodiment.

Figure 3:
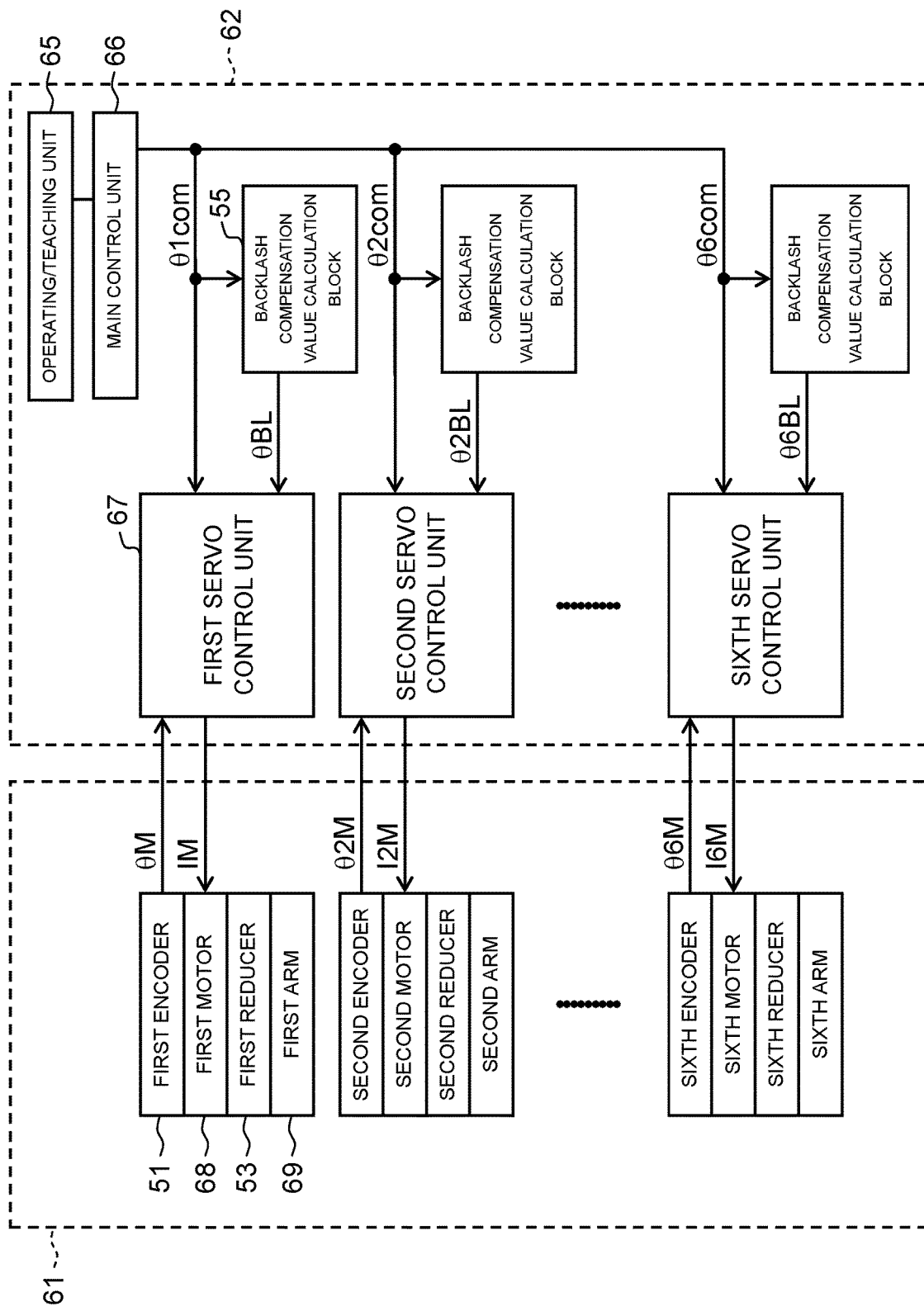
FIG. 3 is a block diagram illustrating the configuration regarding the position control for a vertically articulated robot according to an embodiment.

FIG. 3 is a block diagram illustrating the configuration regarding the position control for the vertically articulated robot according to the embodiment. Specifically, FIG. 3 is a block diagram illustrating the outline of the internal configurations of robot mechanism 61 and robot control device 62.

Note that FIG. 2 illustrates the relationship between two arms via a motor.

As illustrated in FIG. 1, robot 60 includes robot mechanism 61 and robot control device 62. Robot mechanism 61 includes arms 63 and joint shafts 64 and is driven using a reducer provided near each of joint shafts 64.

As illustrated in FIG. 2, in robot mechanism 61, first arm 1, second arm 9, motor 2, and reducer 3 are mechanically coupled.

However, in FIG. 2, in order to facilitate description, only the outline of a part of robot mechanism 61 is illustrated.

Specifically, motor 2, reducer 3, and bearing 4 are fixed to first arm 1 serving as a base for mounting a motor. Second arm 9 which is a load is coupled to a rotating unit of secondary reducer 7 so that second arm 9 is driven.

Note that as motor 2, a servo motor is used, for example.

Primary reducer 6 is coupled to rotor 5 located in motor 2, and rotates about a motor rotation axis at motor rotation speed ωM. Reducer 3 reduces motor rotation speed ωM to load rotation speed ωL at reduction ratio Rg.

$$Rg = \omega M / \omega L \quad (1)$$

Note that reducer 3 includes play (clearance) and a spring component between primary reducer 6 and secondary reducer 7 and thus Expression (1) is established only in the steady state where primary reducer 6 is in contact with secondary reducer 7 so that the play (clearance) is brought to one side and the elongation of the spring is constant.

As illustrated in FIG. 3, in accordance with the stored trajectory indicated by operating/teaching unit 65 disposed inside robot control device 62, main control unit 66 outputs position commands, namely, θ1com to θ6com, for the shafts of the robot. Note that in the present embodiment, the number of shafts is six.

Furthermore, servo control unit 67 (first servo control unit) corresponding to each shaft of the robot controls corresponding motor 68 (first motor), which is located inside robot mechanism 61, in such a manner as to follow the corresponding position command. Subsequently, arm 69 (first arm) is driven via reducer 53 (first reducer).

Note that as motor 68, a servo motor is used, for example.

Specifically, servo control unit 67 outputs electric current control command IM to motor 68, and thus a drive current for motor 68 is controlled. Furthermore, encoder 51 (first encoder) corresponding to motor 68 feeds back rotation position θM of motor 68 to servo control unit 67, and electric current control command IM is adjusted. Here, arm 69 (first arm) in FIG. 3 corresponds to first arm in FIG. 2, for example. Reducer 53 (first reducer) in FIG. 3 corresponds to reducer 3 in FIG. 2, for example. Motor 68 (first motor) in FIG. 3 corresponds to motor 2 in FIG. 2, for example.

Robot control device 62 includes backlash compensation value calculation block 55, and backlash compensation value calculation block 55 calculates backlash compensation value θBL from θcom (hereinafter, θ1com to θ6com will be referred to as θcom), which is the position command, and outputs backlash compensation value θBL to servo control unit 67. Here, the backlash compensation value is for compensating for a positioning error caused by the backlash.

Figure 4:
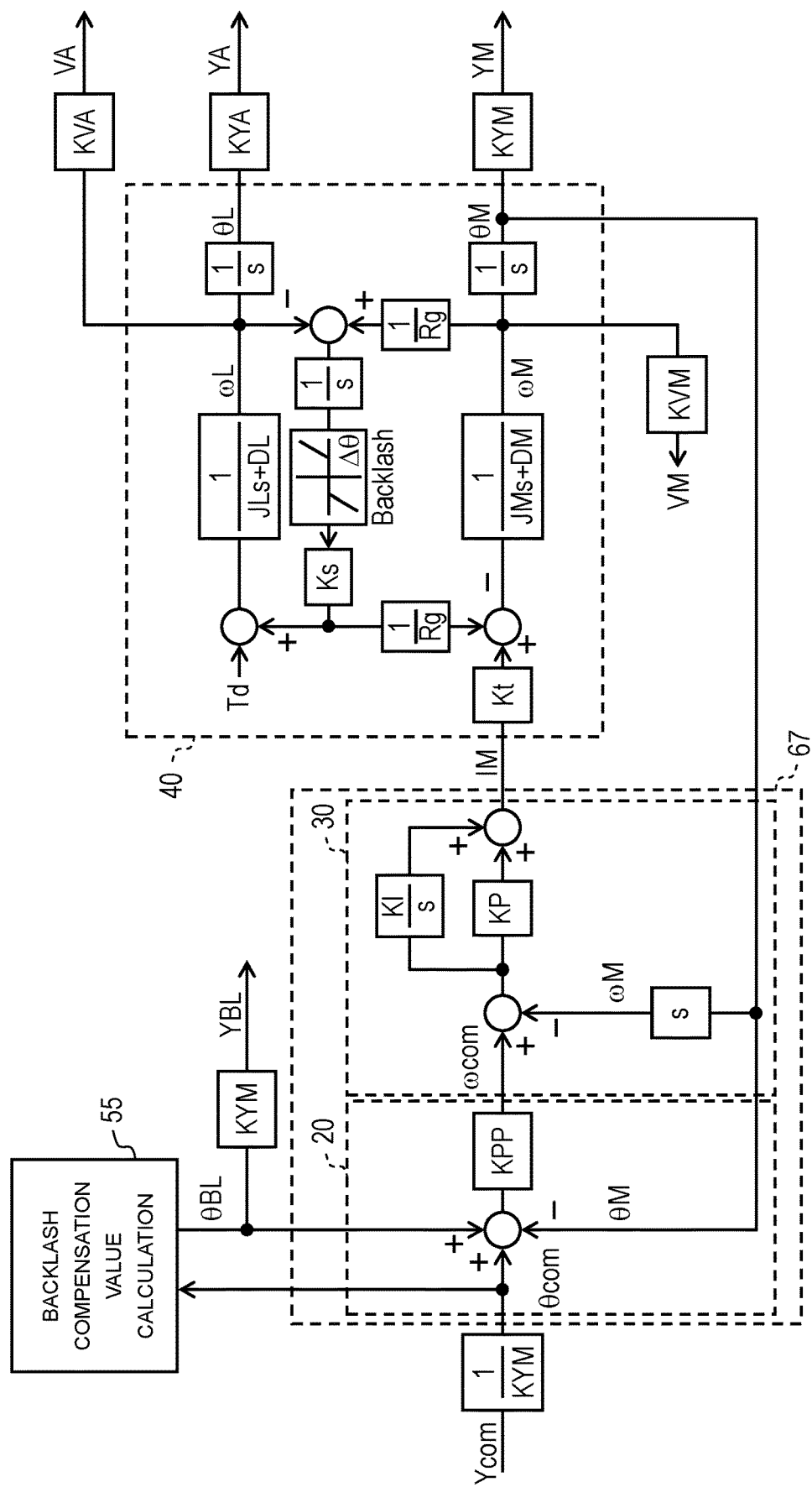
FIG. 4 is a block diagram of a robot drive control system according to an embodiment.

FIG. 4 is a block diagram of a robot drive control system according to the present embodiment.

Note that FIG. 4 illustrates the drive control along only a single axis (Y-axis) for the system illustrated in FIG. 2.

A control model for a system including first arm 1, motor 2, reducer 3, bearing 4, and second arm 9 which are illustrated in FIG. 2 and encoder 51 illustrated in FIG. 3 corresponds to block 40 (a control system model for the robot mechanism) illustrated in FIG. 4.

In block 40, the play and the spring component present between primary reducer 6 and secondary reducer 7 are defined as spring constant Ks.

Furthermore, in block 40, Kt is the torque constant of motor 2; 1/Rg is the reciprocal of the reduction ratio represented by Expression 1; 1/(JMs+DM) is a motor transmission function; 1/(JLs+DL) is a load transmission function; Backlash is a transmission function corresponding to the backlash indicating the play of reducer 3; s is a derivative element; ½ is an integral element; and Td is external force applied to second arm 9 which is a load. In position control block 20, KPP is a proportional gain in a position loop. In speed control block 30, KP is a speed proportional gain; and KI is a speed integral gain.

In the motor transmission function, JM is the moment of inertia of the combination of rotor 5 and primary reducer 6 around the rotation axis; and DM is a coefficient of viscous friction on the motor 2 side. In the load transmission function, JL is the moment of inertia of the combination of second arm 9 which is a load and secondary reducer 7 around the rotation axis; and DM is a coefficient of viscous friction on the reducer 3 side.

As illustrated in FIG. 4, position command θcom for the motor is input to position control block 20 of servo control unit 67.

Position command θcom is converted by backlash compensation value calculation block 55 into backlash compensation value θBL, which is then added to original position command θcom. Furthermore, for position command θcom, motor rotation position θM is fed back from encoder 51, and speed command ωcom for the motor is generated from these pieces of information and then input to speed control block 30.

Note that backlash compensation value calculation block 55 calculates, from a stopping direction in position command θcom, backlash compensation value θBL which is added at the time of stop. Note that the "stopping direction" means a direction of movement that has been made until the stop.

For speed command ωcom, motor speed ωM obtained using motor position θM input from encoder 51 is fed back, and thus speed control block 30 generates electric current control command IM (corresponding to the acceleration) for the motor.

Figure 5A:
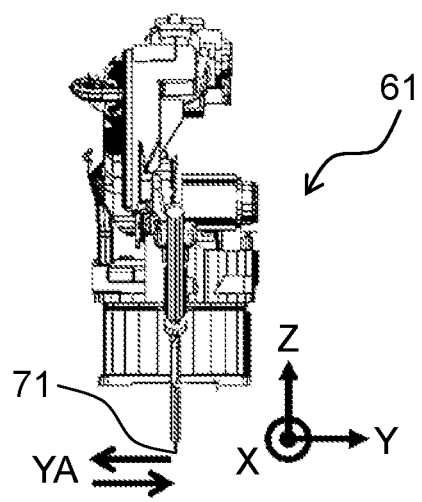
FIG. 5A illustrates a robot mechanism according to an embodiment as seen along the X-axis.
Figure 5B:
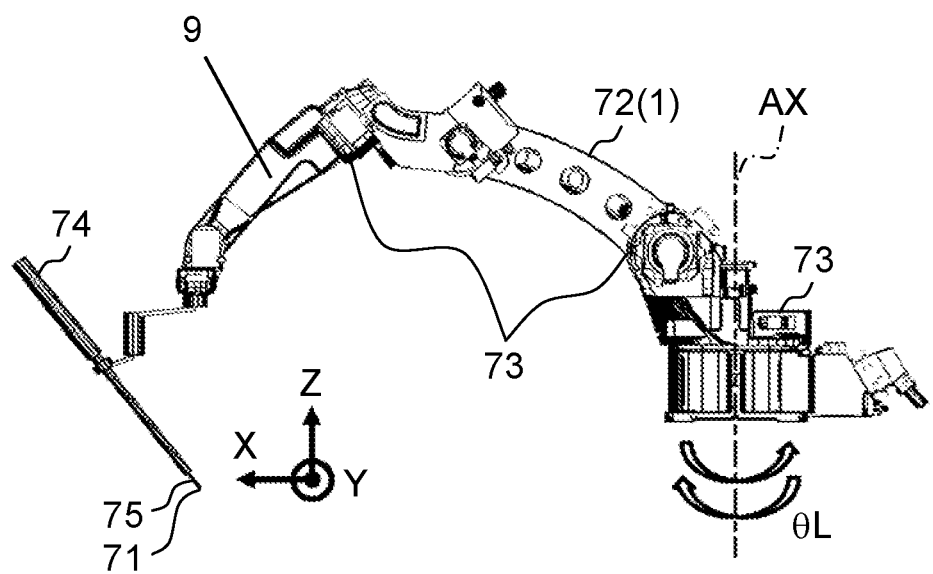
FIG. 5B illustrates a robot mechanism according to an embodiment as seen along the Y-axis.
Figure 5C:
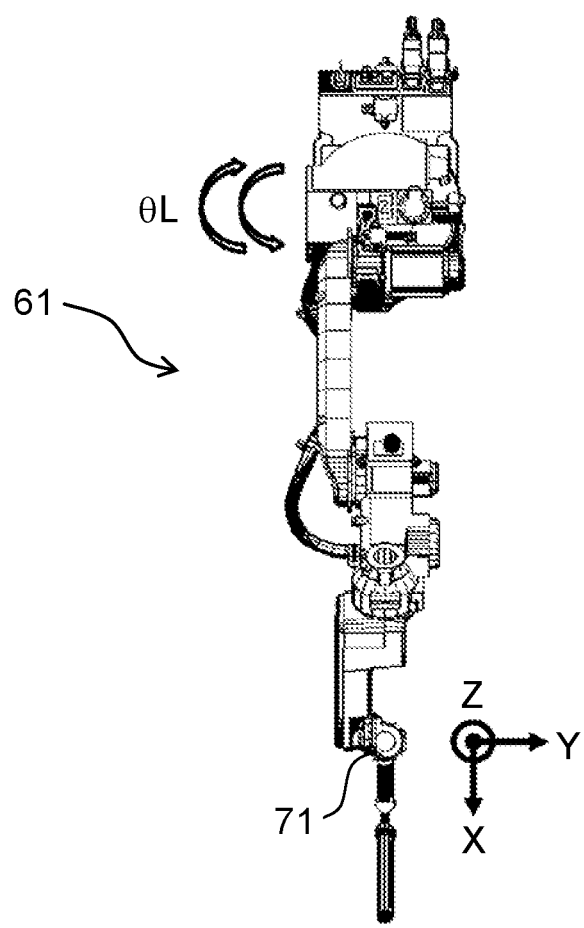
FIG. 5C illustrates a robot mechanism according to an embodiment as seen along the Z-axis.

FIG. 5A to FIG. 5B illustrate an example of robot mechanism 61 as seen along three axes. FIG. 5A, FIG. 5B, and FIG. 5C are respective illustrations of robot mechanism 61 as seen along the X-axis, the Y-axis, and the Z-axis.

In robot mechanism 61, welding torch 74 having welding wire 75 at the tip is attached to arm 72. Driving motor 73 corresponding to each joint shaft allows welding torch 74 to move along any of the X-axis, the Y-axis, and the Z-axis.

The following considers the backlash phenomenon occurring at first axis AX when arm tip 71 is slightly moved (moved with a pitch of 0.5 mm) along the Y-axis. Note that arm tip 71 is the tip of welding torch 74 that includes a protruding portion of welding wire 75.

Arm rotation position θL around first axis AX follows a circular orbit; however, in the illustrated example, arm rotation position θL where X=1,200 mm moves approximately 1 mm along the Y-axis, which can be regarded as substantially linear movement. Therefore, the following description will be made assuming that the rotating operation around first axis AX causes arm tip 71 to linearly move along the Y-axis.

Note that in the following description, motor position YM in terms of the arm tip position, arm tip position YA, motor speed VM in terms of the arm tip speed, arm tip speed VA, and backlash compensation value YBL in terms of the arm tip position are those calculated according to the operation represented by Expression 2-1 to Expression 2-5.

Note that these values are values along the Y-axis.

$$YM = KYM \times \theta M \tag{2-1}$$

$$YA = KYA \times \theta L \tag{2-2}$$

$$VM = KVM \times \omega M \tag{2-3}$$

$$VA = KVA \times \omega L \tag{2-4}$$

$$YBL = KYM \times \theta BL \tag{2-5}$$

Here, the symbols represent the following values.

θM: the rotation position of the motor
θL: the rotation position of the arm tip
ωM: the rotation speed of the motor
ωL: the motor speed of the arm tip
θBL: the backlash compensation position of the motor
KYM: the conversion coefficient used to convert rotation position θM of the motor into motor position YM in terms of the arm tip position
KYA: the conversion coefficient used to convert rotation position θL of the arm into Y-axis arm tip position YA
KVM: the conversion coefficient used to convert rotation speed ωM of the motor into motor speed VM in terms of the arm tip speed
KVA: the conversion coefficient used to convert rotation speed ωL of the arm into Y-axis arm tip speed VA
KYM: the conversion coefficient used to convert the backlash compensation position of the motor into Y-axis motor compensation position YBL in terms of the arm tip position Note that all the conversion coefficients change according to the attitude of the arm.

Effects of Backlash Compensation on Arm Tip Position and Arm Tip Speed

Figure 6A:
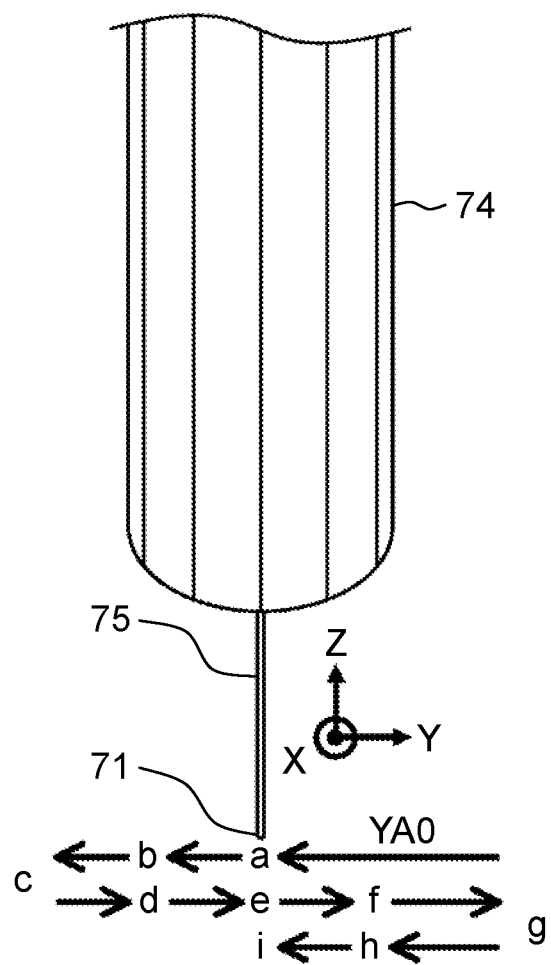
FIG. 6A illustrates movement of a robot arm along the Y-axis according to a comparison example.
Figure 6B:
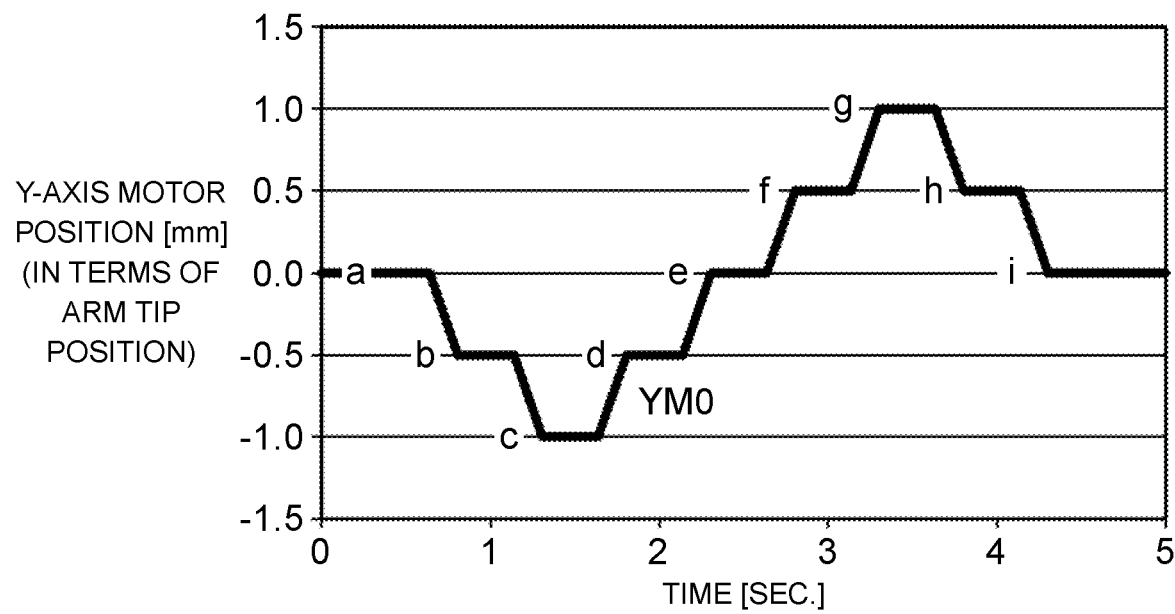
FIG. 6B illustrates temporal transitions of the Y-axis position of a motor driving an arm according to a comparison example.
Figure 6C:
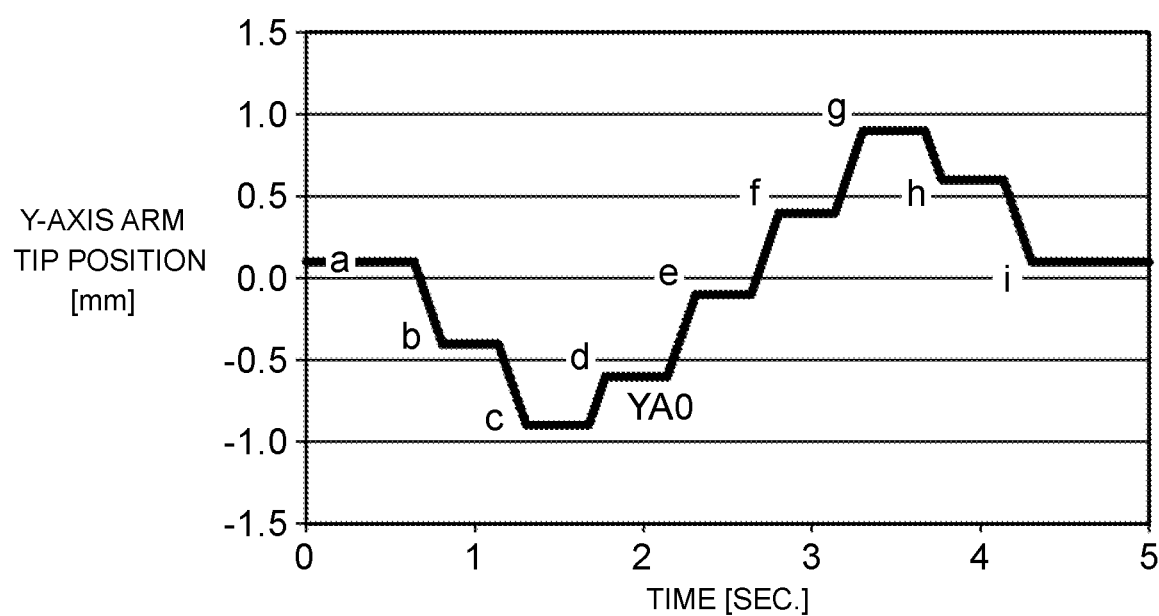
FIG. 6C illustrates temporal transitions of the Y-axis position of an arm tip according to a comparison example.

FIG. 6A to FIG. 6C illustrate movement of the robot mechanism according to a comparison example. FIG. 6A illustrates the movement of the robot arm (arm) along the Y-axis. FIG. 6B illustrates temporal transitions of the Y-axis position of the motor driving the arm. FIG. 6C illustrates temporal transitions of the Y-axis position of the arm tip.

Figure 8A:
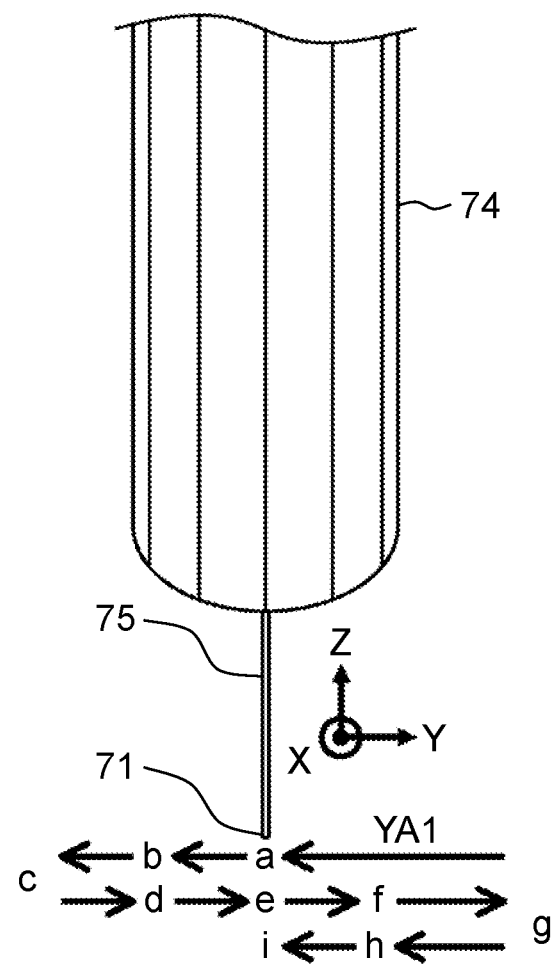
FIG. 8A illustrates movement of a robot arm along the Y-axis according to another comparison example.
Figure 8B:
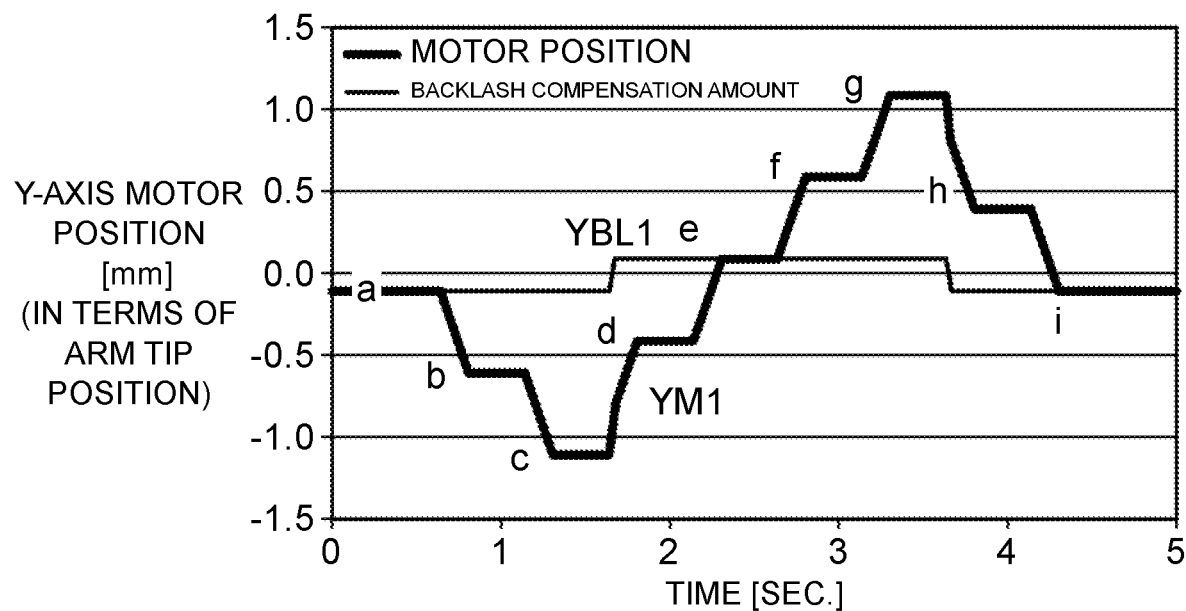
FIG. 8B illustrates temporal transitions of the Y-axis position of a motor driving an arm according to another comparison example.
Figure 8C:
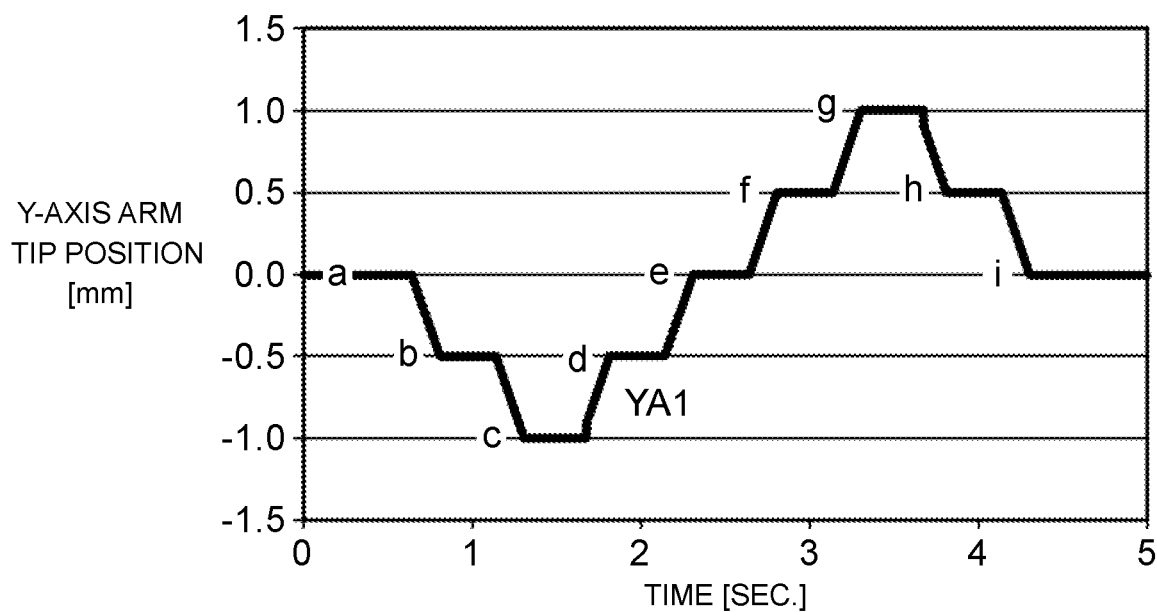
FIG. 8C illustrates temporal transitions of the Y-axis position of an arm tip according to another comparison example.

FIG. 8A to FIG. 8C illustrate movement of the robot mechanism according to another comparison example. FIG. 8A illustrates the movement of the robot arm along the Y-axis. FIG. 8B illustrates temporal transitions of the Y-axis position of the motor driving the arm. FIG. 8C illustrates temporal transitions of the Y-axis position of the arm tip.

Figure 9:
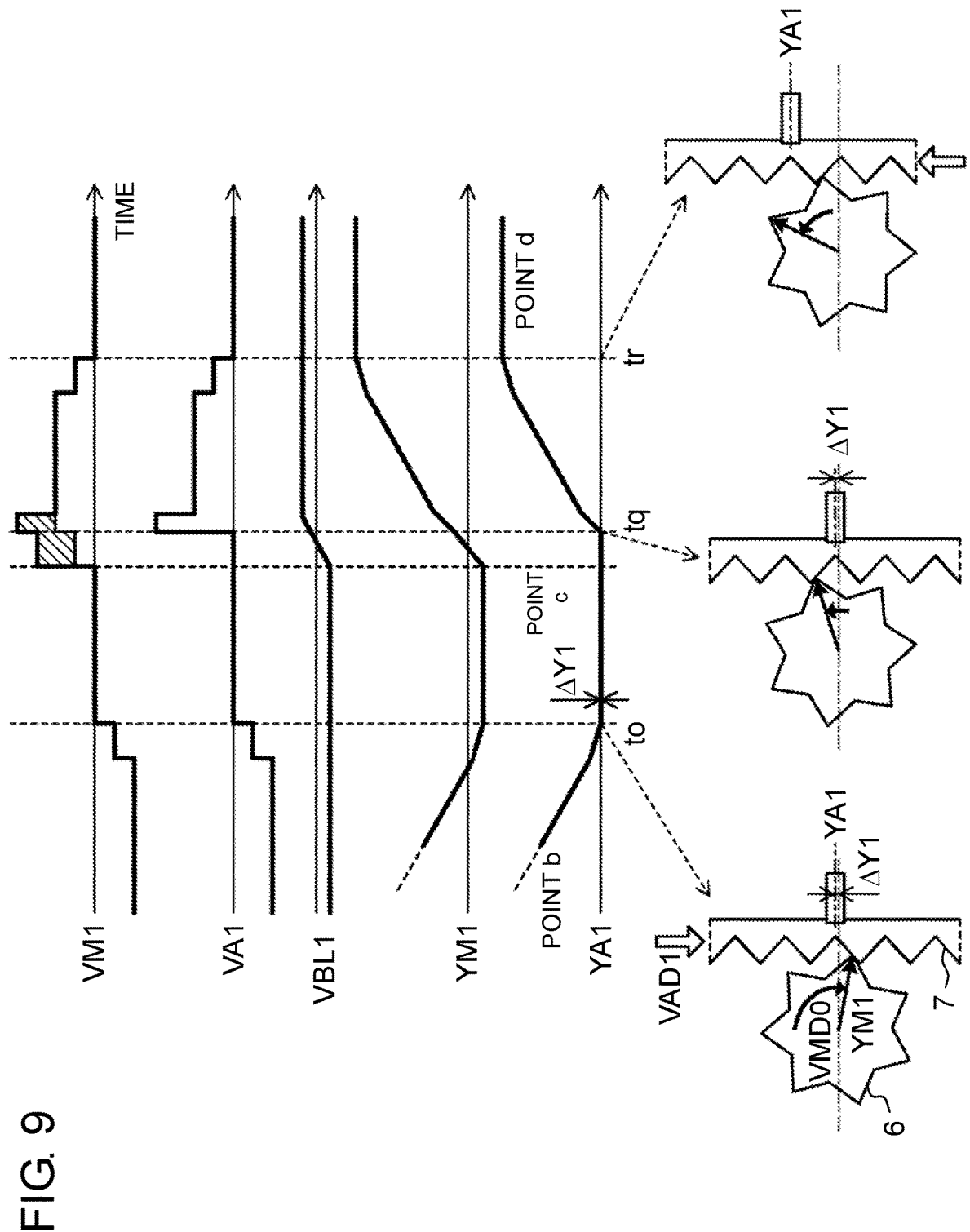
FIG. 9 illustrates, in chronological order, moving, stopping, and reversely moving of a robot mechanism according to another comparison example.

FIG. 9 illustrates, in chronological order, details of moving, stopping, and reversely moving operations of the robot mechanism illustrated in FIG. 8A to FIG. 8C.

Figure 10A:
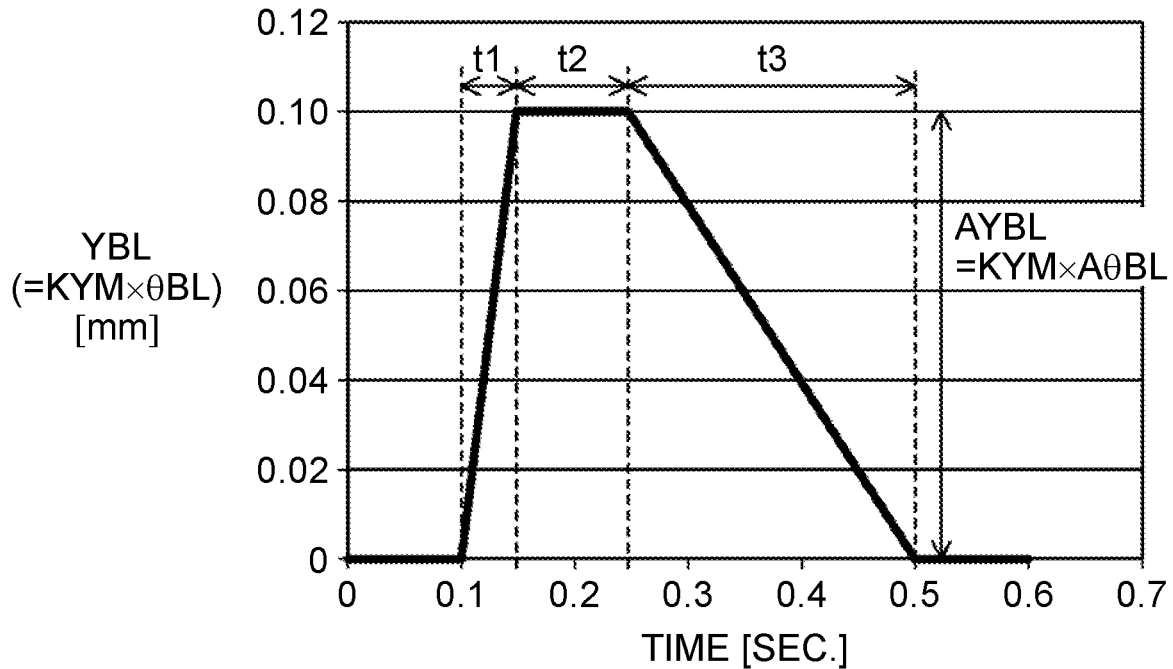
FIG. 10A illustrates temporal changes of a backlash compensation value according to an embodiment.
Figure 10B:
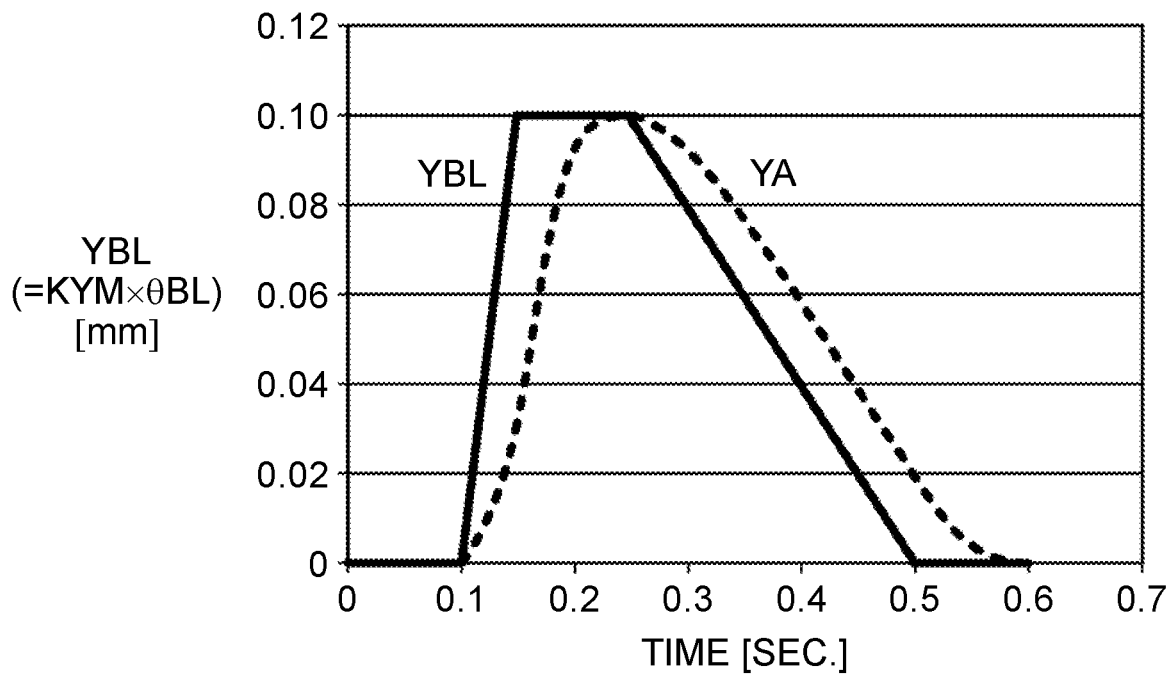
FIG. 10B illustrates a delay in time response of an arm tip position relative to backlash compensation according to an embodiment.

FIG. 10A and FIG. 10B illustrate the backlash compensation according to the present embodiment. FIG. 10A illustrates temporal changes of the backlash compensation value. FIG. 10B illustrates a delay in time response of the arm tip position relative to the backlash compensation. Note that the backlash compensation value is indicated by YBL which is represented by Expression 2-5.

Figure 11A:
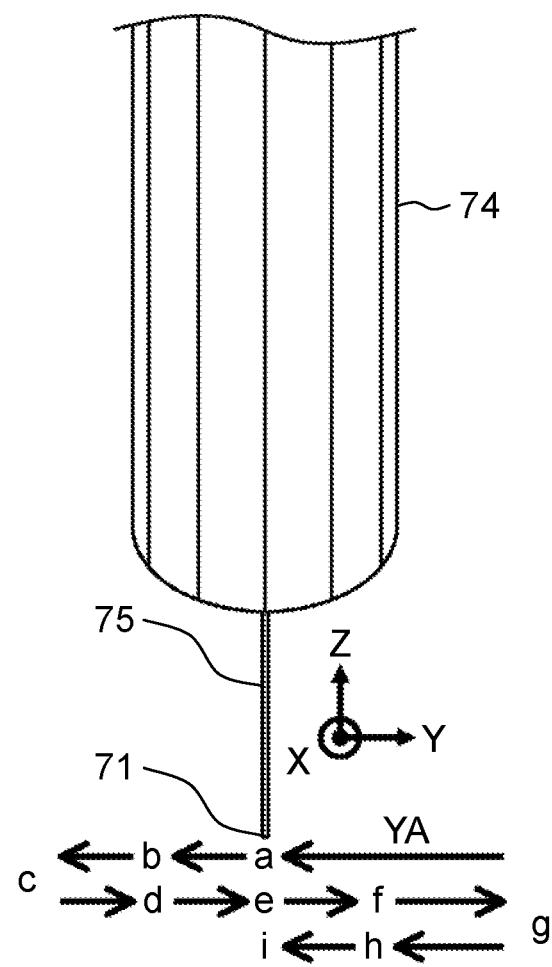
FIG. 11A illustrates movement of a robot arm along the Y-axis according to an embodiment.
Figure 11B:
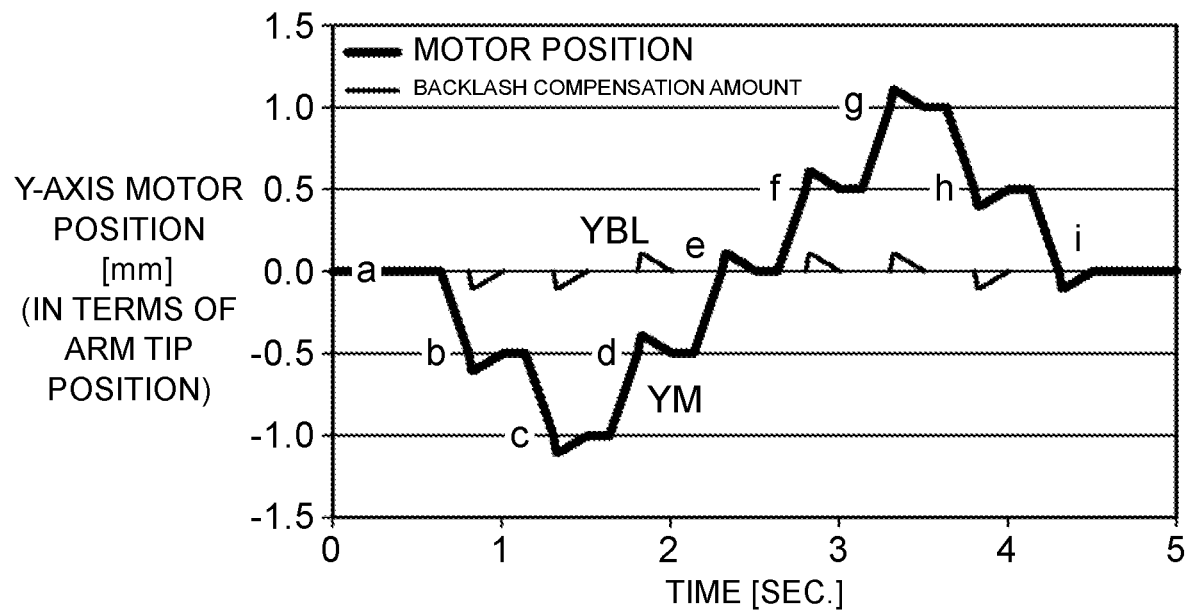
FIG. 11B illustrates temporal transitions of the Y-axis position of a motor driving an arm according to an embodiment.
Figure 11C:
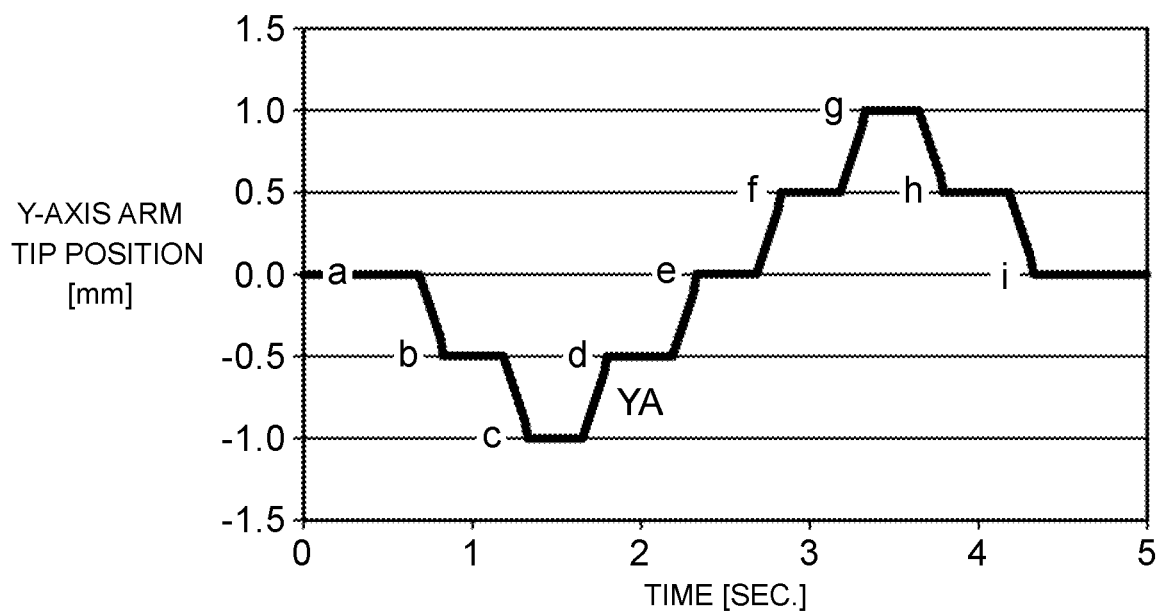
FIG. 11C illustrates temporal transitions of the Y-axis position of an arm tip according to an embodiment.

FIG. 11A to FIG. 11C illustrate movement of the robot mechanism according to the present embodiment. FIG. 11A illustrates the movement of the robot arm along the Y-axis. FIG. 11B illustrates temporal transitions of the Y-axis position of the motor driving the arm. FIG. 11C illustrates temporal transitions of the Y-axis position of the arm tip.

Figure 12:
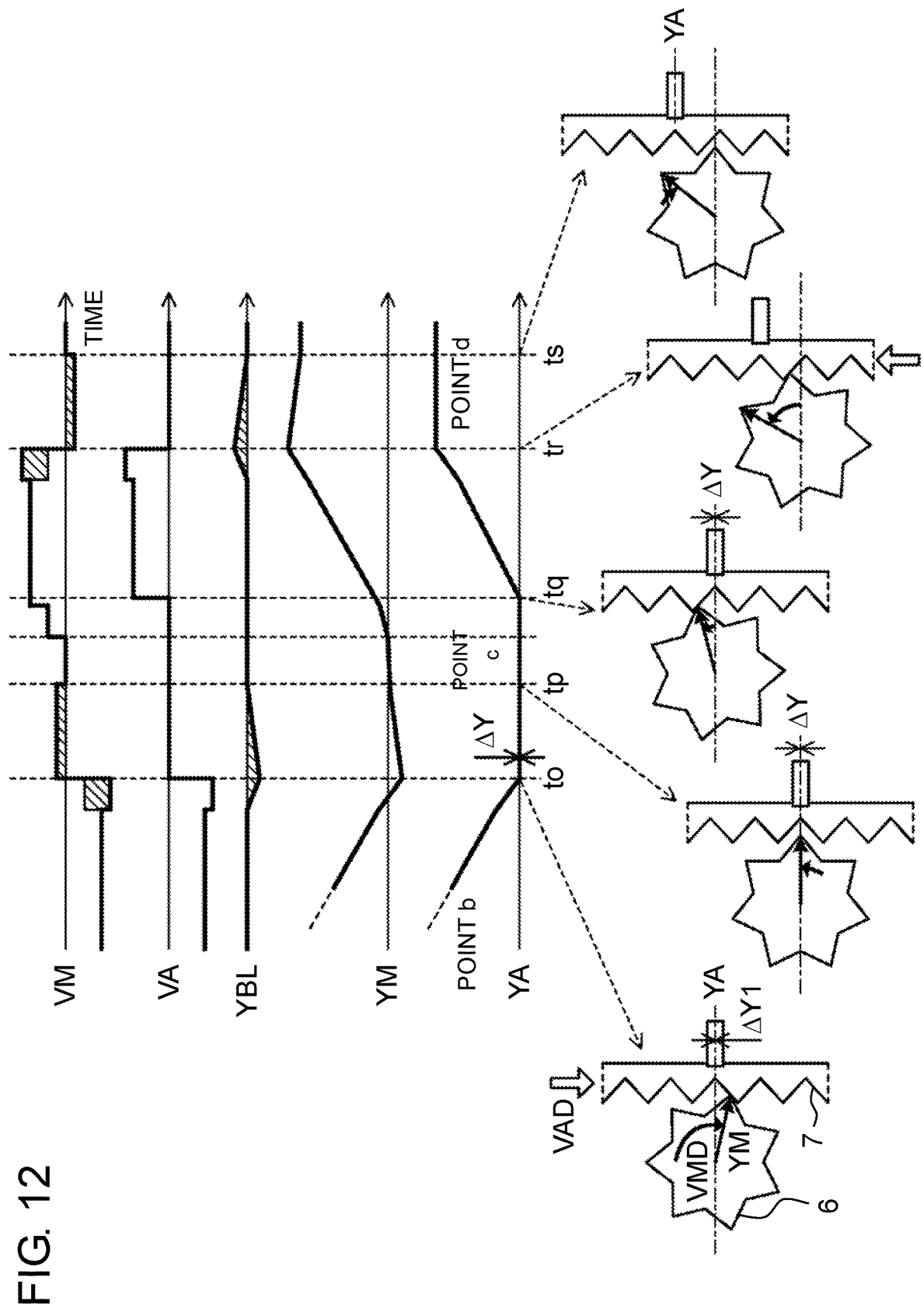
FIG. 12 illustrates, in chronological order, moving, stopping, and reversely moving of a robot mechanism according to an embodiment.

FIG. 12 illustrates, in chronological order, details of moving, stopping, and reversely moving operations of the robot mechanism illustrated in FIG. 11A to FIG. 11C.

Figure 13:
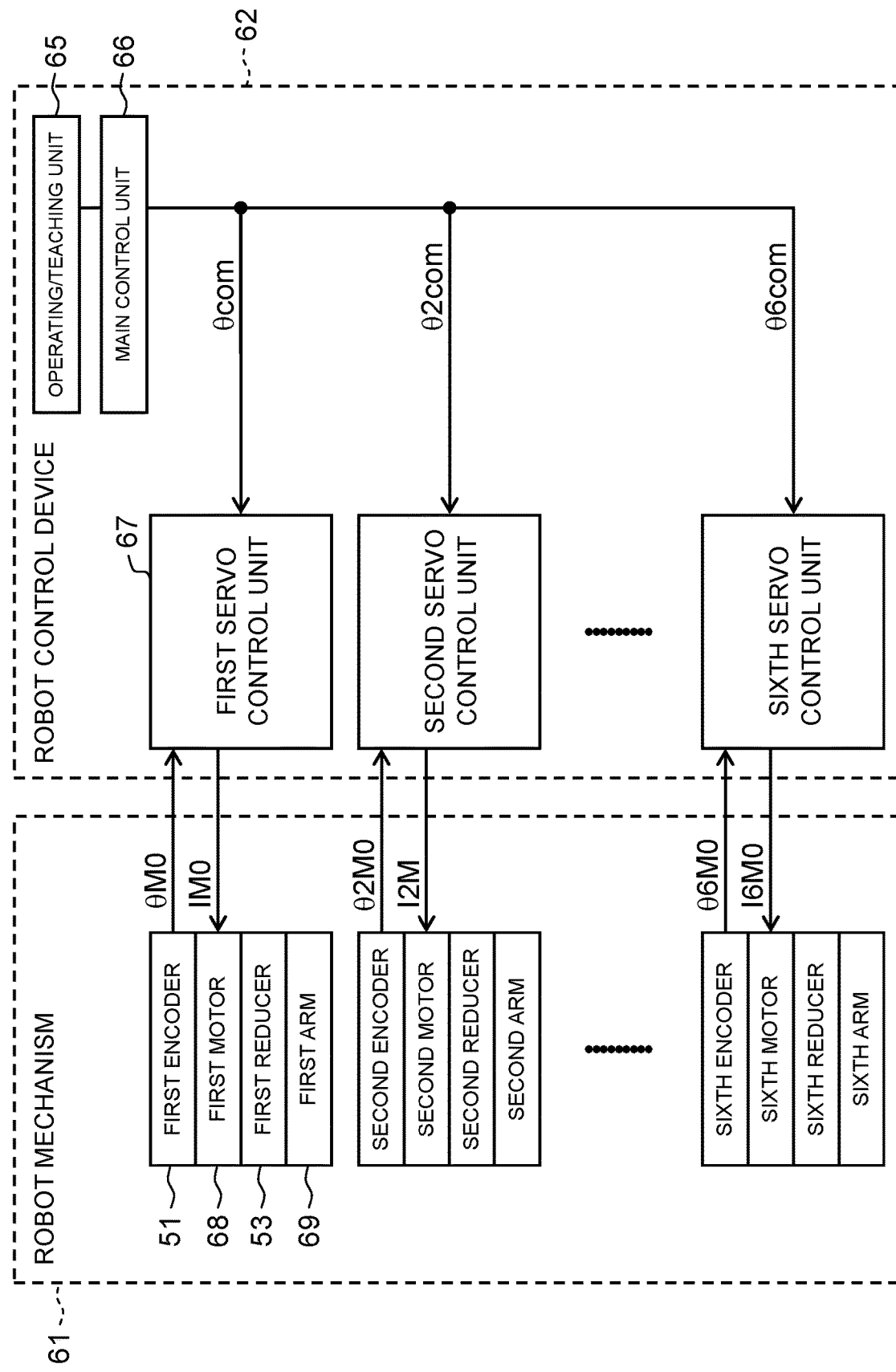
FIG. 13 is a block diagram illustrating the configuration regarding the position control for a vertically articulated robot according to a comparison example.

FIG. 13 is a block diagram illustrating the outline of the configuration regarding the position control for a vertically articulated robot according to a comparison example, specifically, the internal configurations of robot mechanism 61 and robot control device 62.

Figure 14:
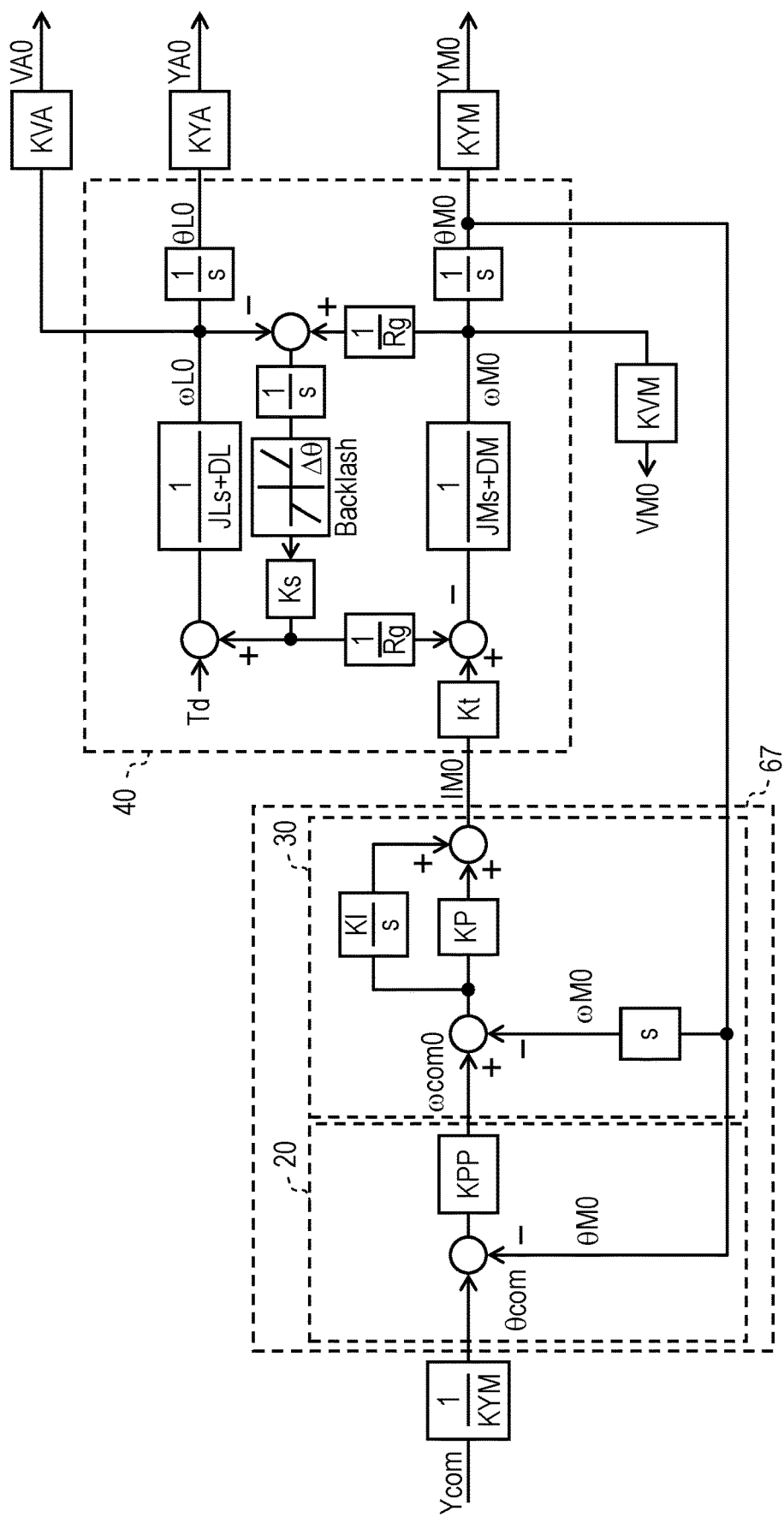
FIG. 14 is a block diagram of a robot drive control system according to a comparison example.

FIG. 14 is a block diagram of a robot drive control system according to a comparison example.

Here, the comparison example is a control system for the operations and configurations illustrated in FIG. 6A to FIG. 6C, FIG. 7, FIG. 13, and FIG. 14. Specifically, the comparison example corresponds to the case where the control system according to the present embodiment does not include backlash compensation value calculation block 55. Thus, in this comparison example, the backlash compensation is not performed.

Another comparison example is a control system for the operations and configurations illustrated in FIG. 8A to FIG. 8C and FIG. 9. Another comparison example is substantially the same as the configuration described in the present embodiment, but is different from the present embodiment, for example, in the method for adding the backlash compensation value to the position command and subtracting the backlash compensation value from the position command, as described later.

In the following description, VMi, YAi, θMi, and the like (i=0, 1) where subscript i is 0 represent motor position YM, arm tip position YA, motor rotation position θM, and the like according to the comparison example. VMi, YAi, θMi, and the like (i=0, 1) where subscript i is 1 represent motor position YM, arm tip position YA, motor rotation position θM, and the like according to another comparison example. When there is no subscript, VM, YA, θM, and the like represent motor position YM, arm tip position YA, motor rotation position θM, and the like according to the present embodiment.

Note that regardless of the presence or absence of the subscript, VMi, YAi, VMi, VAi, and VBLi are values represented by Expressions 2-1 to 2-5 indicated above.

Furthermore, controlling the movement of the robot mechanism along the Y-axis will be described below.

First, the comparison example will be described.

As illustrated in FIG. 6A, when the backlash compensation is not performed, arm tip 71 moves in the −Y direction and stops at point a. At this time, as illustrated in FIG. 6B, motor position YM0 has reached the target position (0 mm), but, as illustrated in FIG. 6C, arm tip position YA0 has stopped before the target position (0.1 mm) due to the backlash.

Next, arm tip 71 moves 0.5 mm in the −Y direction and stops at point b. At this time, as illustrated in FIG. 6B, motor position YM0 has reached the target position (−0.5 mm), but, as illustrated in FIG. 6C, arm tip position YA0 has stopped before the target position (−0.4 mm) due to the backlash. Note that the amount of movement of arm tip position YA0 moving from point a to point b is equal to a target value (−0.5 mm).

The movement from point b to point c is substantially the same as the movement from point a to b.

Next, +0.5 mm movement is made in the +Y direction and stops at point d. The movement from point c to point d is opposite in operating direction to the movement that has been made so far, and thus the rotation direction of motor 73 is reversed. At this time, motor position YM0 has reached the target position (−0.5 mm), but, as illustrated in FIG. 6C, arm tip position YA0 has stopped before the target position (−0.6 mm) due to the backlash. Furthermore, in the movement from point c to point d, the amount of movement of arm tip position YA0 (0.3 mm) is less than a target value (0.5 mm). At the portion where the operating direction is reversed, arm tip position YA0 fails to reach the target position and moreover, the amount of movement thereof is small.

This means that in the case where the backlash compensation is not performed, when the arm tip is advanced and retracted in one direction, the arm tip does not return to the original position. In this comparison example, in order to return the arm tip to point d which is the target position, the amount of movement needs to be set to 0.2 mm and then another movement needs to be made in the positive direction, or −0.5 mm backward movement needs to be made after moving to point e, either of which leads to an increase in man-hours for teaching.

This situation will be further described with reference to FIG. 7. Note that VMD0 represents the rotation direction of the motor and VAD0 represents the movement direction of arm tip position VA0.

Figure 7:
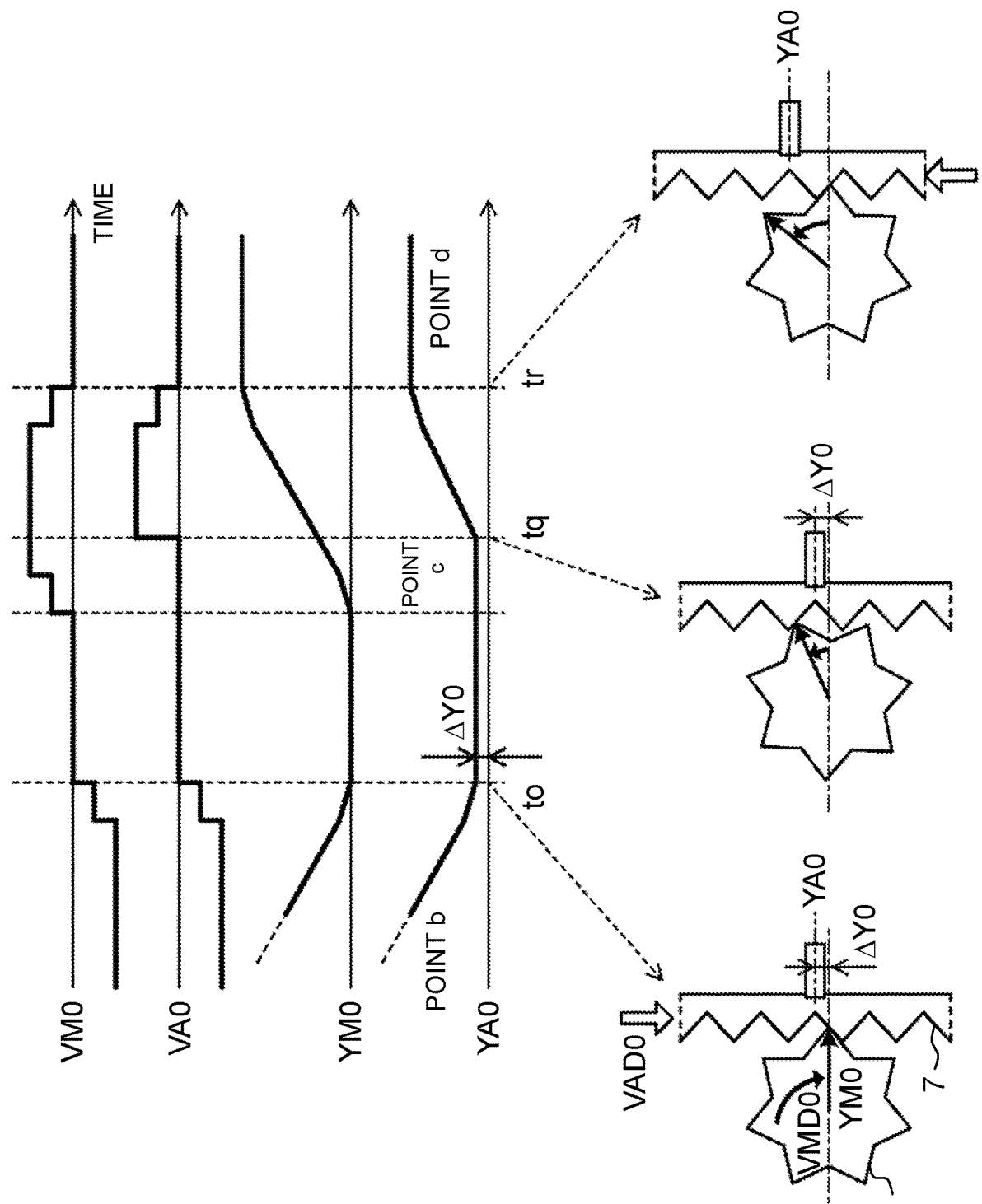
FIG. 7 illustrates, in chronological order, moving, stopping, and reversely moving of a robot mechanism according to a comparison example.

At time to in FIG. 7, when primary reducer 6 stops at position YM0 after rotating clockwise, the position of secondary reducer 7, that is, arm tip position YA0, stops the distance equivalent to ΔY0 before the target due to the effects of the backlash attributed to the play (clearance) of reducer 3. In FIG. 7, in order to facilitate description, point c is set as a base (=0) along the vertical axis of the graph.

Upon the reverse movement of the arm from point c to point d, even when motor position YM0 changes in the positive direction, the arm idles as much as the play (clearance) of the reducer, and thus arm tip position YA0 remains unchanged until time tq. In other words, arm tip speed VA0 remains 0 while motor speed VM0 increases on the positive side.

Arm tip position YA0 starts changing in the positive direction at time tq and stops at a point in time (time tr) when motor position YM0 reaches the position corresponding to point d. However, arm tip position YA0 stops the distance equivalent to the play (clearance) of the reducer before the target.

In this comparison example, upon the movement from point c to point d, arm tip position YA0 moves forward 0.3 mm only while motor position YM0 moves forward 0.5 mm.

This shows that in the case where the backlash compensation is not performed, the positional deviation of the arm tip relative to the control target value becomes large. In particular, when the motor is driven and controlled so that the robot arm moves, stops, and reversely moves in sequence, the positional deviation becomes large.

Next, another comparison example will be described.

In another comparison example, although the backlash compensation itself is performed, arm tip backlash compensation value YBL1 is added in the travel direction to compensate for the deviation (0.1 mm) caused by the backlash, as illustrated in FIG. 8B. This is equivalent to addition of backlash compensation value θBL1 corresponding to arm tip backlash compensation value YBL1 to position command θcom in the control system illustrated in FIG. 3 and FIG. 4, for example.

As a result of performing the above-described compensation, arm tip position YA1 reaches the target position without deviations, as illustrated in FIG. 8C.

However, when this backlash compensation is applied to the case where the robot arm moves, stops, and reversely moves in sequence, as described above, the backlash compensation portion is added to the position command for the reverse operation, and thus the speed immediately after the start of the operation may rise.

This will be further described with reference to FIG. 9.

At time to in FIG. 9, when primary reducer 6 stops at position YM1 after rotating clockwise, the position of secondary reducer 7, that is, arm tip position YA1, stops at the target position by the backlash compensation ($\Delta$Y1=0). In FIG. 9, point c is set as a base along the vertical axis of the graph, as in FIG. 7.

Upon the reverse movement of the arm from point c to point d, even when motor position YM1 changes in the positive direction, the arm idles as much as the play (clearance) of the reducer, and thus arm tip position YA1 remains unchanged until time tq. Thus, arm tip speed VA1 remains 0 while motor speed VM1 increases on the positive side.

However, since the backlash compensation value is added to the position command, the speed for backlash compensation is superimposed on motor speed VM1, and at time tq, arm tip speed VA1 upon start of the movement of arm tip position YA1 in the positive direction is higher than arm tip speed VA0 in FIG. 7 obtained in the case where the backlash compensation is not performed.

Furthermore, in the case where the operating direction is not reversed, there is no change in the amount of addition of the backlash compensation value to the position command, meaning that arm tip speed VA1 is different between the forward movement and the reverse movement.

Thus, the backlash compensation value needs to be added in the travel direction in the position command before the robot stops, and the backlash compensation value needs to be gradually reduced in a period during which the robot is not in motion, as described in the present embodiment.

This will be described in detail below.

In FIG. 10A, the start point of period t1 is the point in time when an arm stop determination is made. From this point in time, backlash compensation value YBL is added in the stopping direction in period t1 in accordance with the stop timing in rotation position command $\theta$com. After the stop according to position command $\theta$com, backlash compensation value YBL is maintained in period t2, and then backlash compensation value YBL is reduced to 0 in period t3. Note that AYBL represents the amplitude of backlash compensation value YBL which is converted into the arm tip position and A$\theta$BL represents the amplitude of backlash compensation position $\theta$BL of the motor.

The reason why backlash compensation value YBL is maintained in period t2 is that, as illustrated in FIG. 10B, actual arm tip position YA which follows changes in backlash compensation value YBL is delayed relative thereto, meaning that arm tip position YA may fail to reach backlash compensation value YBL unless finite period t2 exceeding zero is provided.

However, in the case where the delay of arm tip position YA is negligible, period t2 may be set to zero.

Furthermore, period t3 is set longer than period t1.

In consideration of the effects of the fictional resistance in robot mechanism 61 which is attributed to the play of reducer 3, settings are configured so that arm tip position YA reaches backlash compensation value YBL in a short time in period t1.

On the other hand, in period t3, in order to prevent the occurrence of motor position YM sliding back due to the effects of the same fictional resistance, backlash compensation value YBL is gradually reduced over period t3 longer than period t1.

Note that assuming that the delay of the arm tip position is negligible, period t2 illustrated in FIG. 10A is set to 0 in an example of the present embodiment illustrated in FIG. 11B and FIG. 12.

As illustrated in FIG. 11B, backlash compensation value YBL is added in the stopping direction before arm tip 71 stops, and backlash compensation value YBL is gradually reduced to 0 after arm tip 71 stops. This is the same as the compensation illustrated in FIG. 10A; each time arm tip 71 stops and then moves, the above-described compensation is repeated. Similarly, at the time when arm tip 71 stops and then reversely moves, backlash compensation value YBL is added in the stopping direction, and after arm tip 71 stops, backlash compensation value YBL is gradually reduced to 0. Note that the "stopping direction" means a direction of movement that has been made until the stop.

As a result of performing the above-described compensation, arm tip position YA1 reaches the target position without deviations, as illustrated in FIG. 11C.

Next, the effects the backlash compensation according to the present embodiment has on arm tip speed VA will be described with reference to FIG. 12.

When primary reducer 6 rotates clockwise and motor position YM reaches the position resulting from addition of backlash compensation value YBL, the position of secondary reducer 7, that is, arm tip position YA, stops at the target position ($\Delta$Y=0) by the backlash compensation. In FIG. 12, in order to facilitate description, point c is set as a base (=0) along the vertical axis.

At time to in FIG. 12, when primary reducer 6 rotates clockwise and motor position YM reaches the position resulting from addition of backlash compensation value YBL, the position of secondary reducer 7, that is, arm tip position YA, stops at the target position ($\Delta$Y=0) by the backlash compensation. In FIG. 12, point c is set as a base along the vertical axis of the graph, as in FIG. 7 and FIG. 9.

Next, the absolute value of backlash compensation value YBL is gradually reduced, and at time tp, motor position YM becomes 0 as in the case where the backlash compensation is not performed. In other words, motor position YM stops in the vicinity of the center of the play (clearance) of reducer 3.

Next, the arm starts reversely moving from point c to point d; as illustrated in FIG. 12, even when motor position YM1 changes in the positive direction before time tq, the arm idles as much as the play (clearance) of the reducer, and thus arm tip position YA does not change and remains 0 until time tq.

However, this shows that upon the start of movement from point c, the backlash compensation portion is not added to the position command, and thus arm tip speed VA at time tq when arm tip position YA starts moving is not higher than arm tip speed VA0 obtained in the case where the backlash compensation is not performed.

Subsequently, when primary reducer 6 keeps rotating counterclockwise and motor position YM reaches the position resulting from addition of backlash compensation value YBL (time tr), arm tip position YA stops at point d which is the target position ($\Delta$Y=0) by the backlash compensation. Thereafter, the absolute value of backlash compensation value YBL is gradually reduced, and at time ts, motor position YM becomes 0 as in the case where the backlash compensation is not performed. In other words, motor position YM stops in the vicinity of the center of the play of reducer 3.

As described above, according to the present embodiment, the backlash compensation value is added in the travel direction in the position command before the robot stops, and the backlash compensation value is gradually reduced in a period during which the robot is not in motion, resulting in robot arm movement in which arm tip position YA can accurately move to the target position. At the same time, it is possible to suppress the rise of arm tip speed VA at the time when the arm stops and moves.

In particular, it is possible to reliably suppress the rise of arm tip speed VA at the time when the robot arm stops and reversely moves.

Furthermore, the robot controlling method according to the present embodiment is very usefully applied particularly to a welding robot.

In the case of arc welding using a welding robot, the robot arm temporarily stops at a welding start point and, after an electric arc is generated, starts moving in a welding direction.

When the direction of movement to the welding start point and the welding direction are opposite, if the backlash compensation such as that described in another comparison example is performed, the speed immediately after the start of the movement in the welding direction becomes high. This produces serious effects on the finish of the welding.

FIG. 15A to FIG. 15D illustrate the process flow of arc welding according to another comparison example.

FIG. 16A to FIG. 16D illustrate the process flow of arc welding according to the present embodiment.

Figure 15A:
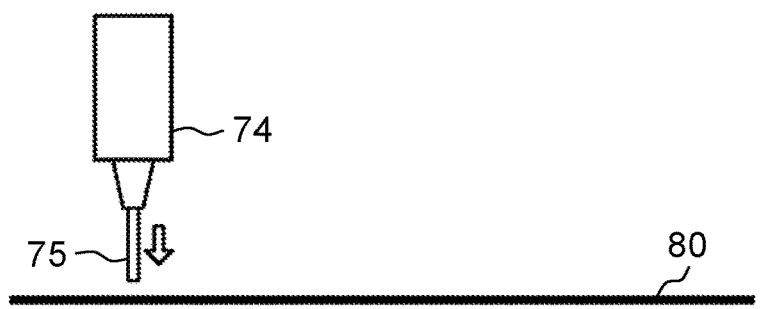
FIG. 15A illustrates the process flow of arc welding according to another comparison example, illustrating movement of a welding torch relative to a workpiece.
Figure 15B:
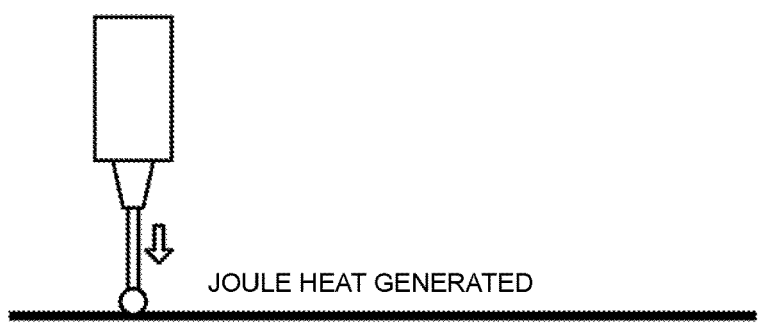
FIG. 15B illustrates the process flow of arc welding according to another comparison example, illustrating electrical conduction of a welding wire.
Figure 15C:
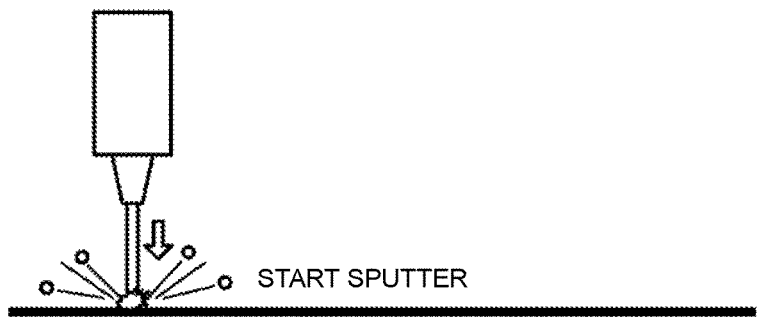
FIG. 15C illustrates the process flow of arc welding according to another comparison example, illustrating generation of sputter.

As illustrated in FIG. 15A, in the state where the robot is not in motion, welding wire 75 attached to welding torch 74 begins to be fed toward workpiece 80. As illustrated in FIG. 15B, when welding wire 75 reaches workpiece 80, an electric current flows through welding wire 75, and thus Joule heat is generated.

Because of this Joule heat, welding wire 75 bursts and start sputter is generated, as illustrated in FIG. 15; thus, an air gap is formed between welding wire 75 and workpiece 80, and an electric arc is produced.

Figure 15D:
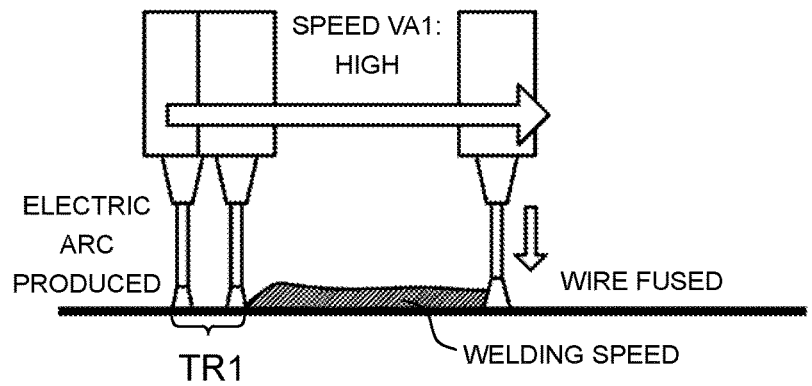
FIG. 15D illustrates the process flow of arc welding according to another comparison example, illustrating movement of a welding torch along a surface of a workpiece.

As illustrated in FIG. 15D, after the electric arc is produced, welding torch 74 moves in the welding direction while welding wire 75 is fused and melted down to workpiece 80, and thus a welding bead is formed along the movement trajectory of welding wire 75.

However, if the traveling speed of welding torch 74 between the production of the electric arc and the start of fusion of the wire, that is, arm tip speed VA1, is high, a phenomenon in which the bead is not formed, but only the burn of the electric arc is left may occur, and in addition, there may be a shortage of the electric arc, causing a welding failure. In this case, a trace of the burn of the electric arc is left in TR1 illustrated in FIG. 15D.

Furthermore, as described above, arm tip speed VA1 is different between the forward movement and the reverse movement.

In any case, at the start of electric arc production (hereinafter referred to as an electric arc start), fine timing adjustment of the operations, etc., of the robot is necessary, and it is not permissible that the backlash compensation affects the electric arc start.

Figure 16A:
FIG. 16A illustrates the process flow of arc welding according to an embodiment, illustrating movement of a welding torch relative to a workpiece.
Figure 16B:
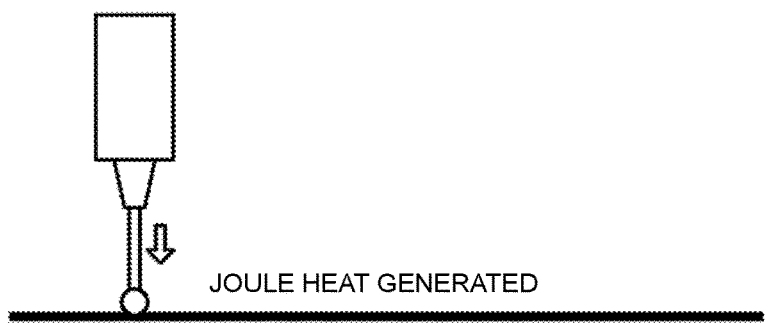
FIG. 16B illustrates the process flow of arc welding according to an embodiment, illustrating electrical conduction of a welding wire.
Figure 16C:
FIG. 16C illustrates the process flow of arc welding according to an embodiment, illustrating generation of sputter.
Figure 16D:
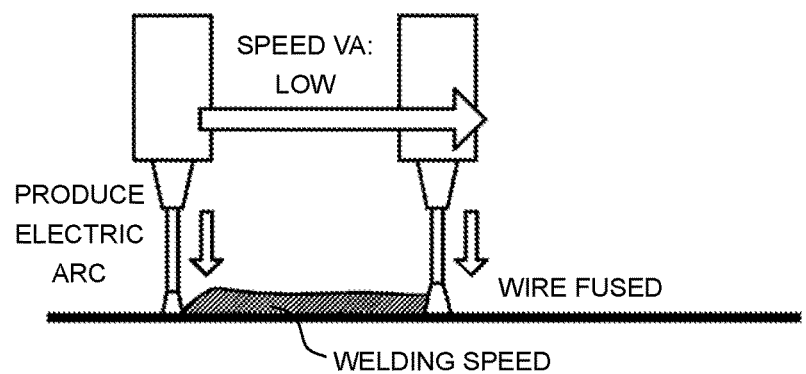
FIG. 16D illustrates the process flow of arc welding according to an embodiment, illustrating movement of a welding torch along a surface of a workpiece.

According to the present embodiment, as illustrated in FIG. 16D, arm tip speed VA after the electric arc production is not as high as that in the case illustrated in FIG. 15D and thus does not affect the stability of the process at the start of welding.

Furthermore, at a point in time when the arm starts moving after having stopped, motor position YM moves from the vicinity of the center of the play of the reducer, meaning that the behavior thereof does not change regardless of whether or not the operating direction is reversed.

Note that at the time when the arm stops moving, that is, when the electric arc production ends, backlash compensation value YBL is added, and thus arm tip speed VA slightly rises; however, at this time, because the stable welding process already in the steady state is suspended, the process is hardly affected.

Furthermore, backlash compensation value YBL added at the time when the operation stops is thereafter gradually reduced to 0, becoming half of backlash compensation value YBL1 indicated in FIG. 8B and FIG. 9. Accordingly, the speed for backlash compensation to be superimposed on motor speed VM is reduced by half. In other words, the rise of arm tip speed VA is suppressed.

Note that in the present embodiment, the control of linear movement of the robot arm has been described as an example, but the above-described control method may be applied not only to the control of movement along a straight line, but also to the control of movement along a curve. Furthermore, the above-described control method can be applied, for example, to treat a three-dimensional object.

Moreover, the above-described control method may be applied not only to the control of movement of the arm, but also to industrial machinery such as an automatic transport machine.

Furthermore, although the control for a welding robot has been mainly described in the present embodiment, the above-described control method may be applied not only to the welding robot, but also to industrial robots used for other purposes.

The robot according to the present disclosure can perform the backlash compensation while suppressing the sharp rise of the operation start speed of the robot upon resuming operating after having stopped.

The robot according to the present disclosure suppresses the rise of the operation start speed by changing the backlash compensation value before and after the robot stops.

Specifically, this is a robot controlling method for controlling movement of a robot arm using a servo motor and includes: adding, before the robot arm stops, a backlash compensation value to a position command which is input to the servo motor; and gradually reducing the backlash compensation value in a period during which the robot arm is not in motion, and the backlash compensation value is set to have a positive value in accordance with the movement direction of the robot arm.

According to this method, the rise of the movement speed of the robot arm can be suppressed, because the backlash compensation value is not added to the position command, at the time when the robot arm resumes moving, while the backlash compensation is performed before and after the robot arm stops. In the case where the movement directions before and after the robot arm stops are opposite, the rise of the movement speed of the robot arm upon reversal of the movement direction can be suppressed.

Furthermore, performing the backlash compensation allows the robot arm to accurately reach the target position.

Here, it is preferable that the period in which the backlash compensation value is gradually reduced be set longer than the period in which the backlash compensation value is added.

According to this method, it is possible to prevent the occurrence of the motor position sliding back due to the effects of the fictional resistance in the robot which is attributed to the play (clearance) of the reducer; thus, accurate backlash compensation can be performed.

In the welding method disclosed herein, movement of a robot arm having a wire attached thereto is controlled using a servo motor, and a workpiece is welded using the wire. The welding method includes: producing an electric arc between the wire and the workpiece after the robot arm stops; and moving the robot arm to move the wire and welding the workpiece along the movement trajectory thereof after the electric arc is produced. Before the robot arm stops, the backlash compensation value is added to the position command which is input to the servo motor, and the backlash compensation value is gradually reduced in a period during which the robot arm is not in motion; the backlash compensation value is set to have a positive value in accordance with the movement direction of the robot arm.

According to this method, the rise of the movement speed of the robot arm can be suppressed, because the backlash compensation value is not added to the position command, at the time when the robot arm resumes moving, while the backlash compensation is performed before and after the robot arm stops. By suppressing the rise of the movement speed after the robot arm stops during the operation including the reverse operation, it is possible to perform good welding in which no welding bead is formed or no trace of the burn of the electric arc is left.

Furthermore, performing the backlash compensation allows the wire tip to accurately reach the target position, resulting in an improvement in welding accuracy.

Here, it is preferable that the period in which the backlash compensation value is gradually reduced be set longer than the period in which the backlash compensation value is added.

According to this method, it is possible to prevent the occurrence of the motor position sliding back due to the effects of the fictional resistance in the robot which is attributed to the play of the reducer; thus, accurate backlash compensation can be performed.

According to the robot controlling method according to the present disclosure, the robot arm can accurately reach the target position while suppressing the rise of the operation start speed of the robot arm having just stopped which is caused by the effects of the backlash compensation.

INDUSTRIAL APPLICABILITY

According to the robot controlling method according to the present disclosure, the backlash compensation can be performed without an increase in the operation start speed of a robot having just stopped; thus, the robot controlling method according to the present disclosure is usefully applied to an industrial robot such as a welding robot.

REFERENCE MARKS IN THE DRAWINGS 1 first arm
2 motor
3 reducer
4 bearing
6 primary reducer
7 secondary reducer
9 second arm
20 position control block
30 speed control block
40 block
51 encoder
53 reducer
55 backlash compensation value calculation block
60 robot
61 robot mechanism
62 robot control device
63 arm
64 joint shaft
65 operating/teaching unit
66 main control unit
67 servo control unit
68 motor
69 arm
71 arm tip
72 arm
73 motor
74 welding torch
75 welding wire
80 workpiece
AX first axis

The invention claimed is:

1. A robot controlling method for operating an arm using a motor, the robot controlling method comprising:
increasing, in a first period during which the arm is being controlled to be in motion, a backlash compensation value that is added to a position command which is input to the motor; and
reducing, in a second period during which the arm is not being controlled to be in motion, the backlash compensation value added, from the backlash compensation value at an end of the first period.

2. The robot controlling method according to claim 1, wherein
in the increasing, the backlash compensation value is added in a travel direction of the arm.

3. The robot controlling method according to claim 1, wherein
the second period is longer than the first period.

4. The robot controlling method according to claim 1, further comprising:
maintaining, in a third period during which the arm is not being controlled to be in motion, the backlash compensation value at the end of the first period, wherein the third period is between the first period and the second period.

5. The robot controlling method according to claim 1, wherein
the arm moves in a direction perpendicular to an extending direction of the arm, in the first period.

6. A welding method for operating an arm having a wire using a motor, and welding a workpiece using the wire, the welding method comprising:
increasing, in a first period during which the arm is being controlled to be in motion, a backlash compensation value that is added to a position command which is input to the motor;
reducing, in a second period during which the arm is not being controlled to be in motion, the backlash compensation value, from the backlash compensation value at an end of the first period;
producing an electric arc between the wire and the workpiece after the arm stops; and
moving the arm to move the wire and welding the workpiece after the electric arc is produced.

7. The welding method according to claim 6, wherein
in the increasing, the backlash compensation value is added in a travel direction of the arm.

8. The welding method according to claim 6, wherein
the second period is longer than the first period.

9. The welding method according to claim 6, further comprising:

maintaining, in a third period during which the arm is not being controlled to be in motion, the backlash compensation value at the end of the first period, wherein the third period is between the first period and the second period.

10. The welding method according to claim 6, wherein the arm moves in a direction perpendicular to an extending direction of the arm, in the first period.

\* \* \* \* \*